May 23, 1950          E. KNAUSS          2,508,403

COMPOUND MASTER CYLINDER

Filed Dec. 11, 1943

INVENTOR.
EDWARD KNAUSS
BY Henry Gifford Hardy
HIS ATTORNEY.

Patented May 23, 1950

2,508,403

UNITED STATES PATENT OFFICE 2,508,403

COMPOUND MASTER CYLINDER

Edward Knauss, Los Angeles, Calif., assignor, by mesne assignments, to Industrial Management Corporation, Los Angeles, Calif., a corporation of California Application December 11, 1943, Serial No. 513,833

4 Claims. (Cl. 60—54.6)

The present invention relates to improvements in a master control for hydraulic brakes for motor vehicles in particular and comprehends the provision of a greatly simplified and improved construction. It is well-known in this art that the driver of a motor vehicle is required to exert a pressure on the foot pedal in order to bring the vehicle to a stop. Normally a person can exert anywhere from sixty to one hundred pounds pressure at the foot pedal which is increased by suitable linkages before the power is applied to the brakes. It is likewise known in this art that due to the fatigue caused by the constant application of foot pedal pressure, most vehicles carrying heavy loads are required to have booster equipment so that additional power can be applied to the brakes for stopping the vehicle, although less pedal pressure is actually required of the driver.

It is important, however, that the "pedal-feel" should be preserved for the psychological effect of having the driver feel that his pressure on the brake pedal is actually applying the brakes to the degree intended. It is an object, therefore, of the present invention to supply a master control for hydraulic brakes which preserves "pedal-feel" and at the same time requires less pedal pressure to produce a corresponding greater pressure in the application of the brakes than is possible by any previous device.

The invention consists primarily of a primary cylinder which is adapted to displace a comparatively large volume of fluid immediately in response to the initial pedal pressure to take up the slack in the line and start to apply the brakes. The same action produces a slight drag during the initial movement and produces a very definite "pedal-feel." There is also a secondary cylinder to automatically reduce the amount of fluid displaced and increase the pressure in the line to produce the required braking effect. Both of these cylinders operate in conjunction with a novel means for automatically compensating for the greater pressures and/or volumes by removal of excess fluid and for cutting down the pedal force required to attain the higher line pressures and also for automatically releasing and replenishing the displaced fluids.

An important object of the present invention is to provide a master control for compound hydraulic brakes of greatly simplified construction.

Another object of the present invention is to provide a new and improved device of the character set forth having improved means for quickly displacing a comparatively large volume of fluid under low pressure to take up slack and initially apply the brakes and to produce a slight drag with a minimum of pedal movement.

A further object is to provide an improved hydraulic brake of the type described in which displacement of a comparatively large volume of fluid under low pressure is automatically reduced to a lesser volume under increased pressure for further application of the brakes, suitable relief and control being present so that at higher brake pressures only a slight increase in pedal pressure is required.

A still further object is to provide an improved means for automatically replenishing fluid displaced during operation of the device.

A further object is to provide in a device of the type described novel means for providing a maximum line pressure with a minimum pedal pressure and still preserving "pedal-feel" and constant increase in pressure.

Another and an important object of the present invention is to provide a device which will produce a uniform back pressure increase on the pedal as the line pressure increases until all of the fluid pressure is released in front of the primary piston.

These and other objects which are readily apparent to those skilled in this art and which are inherent in the invention are accomplished by the device shown in the drawing. The drawing is to be understood as illustrating an embodiment of the invention and is not to be construed as limiting the invention to the form shown.

In the drawing:

Figure 1 is a diagrammatic illustration of a hydraulic braking system including the master control of the present invention.

Figure 2 is an enlarged vertical longitudinal sectional view of the master control or valve detached from the system.

Referring more particularly to the drawing in which like reference numerals are used to indicate like parts, the numeral 10 is used to designate a body having a primary cylinder 12, with one end opening exteriorly of said body 10, and a secondary cylinder 14 arranged coaxially with and partly within one end of said primary cylinder 12 and of lesser diameter than the diameter of said cylinder 12. One end of the secondary cylinder 14 opens into said primary cylinder 12 and the other or outlet end is provided with a reduced chamber 16 having ports 18, the purpose of which will hereinafter be more fully set forth.

The body 10 has a fluid reservoir 20 preferably formed integral therewith and provided with a vented and screw threaded plug or cap 22 which maintains the reservoir at atmospheric pressure. A port 24 connects reservoir 20 with the primary cylinder 12 when forwardly of piston 52 in the inoperative relationship and is closed on the pressure stroke by the inner flange 62 of the piston. The reservoir 20 may be provided with a removable cover plate 11 fastened to the body 10 in any suitable manner but here shown to be secured by screws 15.

The device is provided with a novel pressure and fluid release valve which is responsive to and actuated by the pressures of both the primary and secondary cylinders above the set pressure of the device, to relieve and lessen the foot pedal force. It includes an open-ended cylinder 26 which for convenience may be termed the high pressure cylinder and within it are the high pressure piston 38 and the piston cap 27. The upper portion of piston 38 is crowned to leave openings 40 permitting communication with cylinder 12 via channel 29 with the piston raised, and the top of open-ended cylinder 26 is faced to form a seat 28 for the disc 31 of overlying centrally apertured diaphragm 30. Surrounding the cylinder 26 and the valve seat 28, the casing 10 is bored and faced to mount the diaphragm 30 which is secured in place by a cap 32 attached by any suitable means as screws 33. Within the cap 32 is a control spring 36 which bears against the diaphragm backing plate 35 and a screw plug or adjusting nut 34 by which the compression of the control spring may be adjusted. The adjustment of the plug 34 regulates the pressure with which the diaphragm 30 is held upon the valve seat 28 and so controls the pressure which the piston 26 must exert to unseat the diaphragm. Adjustable communication between the reservoir 20 and the primary cylinder 12 via channel 29, opening 40, and the aperture in diaphragm 30, is thus established.

As stated before, a secondary cylinder 14, is located concentrically with respect to the primary cylinder 12. A centrally apertured piston 42, having a piston cup 43 and a central seal 44 around said central aperture, is reciprocally mounted within the secondary cylinder 14, and normally urged toward the open end of said cylinder and toward a split ring stop 48 by a spring 46. The other end of said spring impinges against a double check valve 50 which normally seats against the open end of reduced chamber 16 in the restricted end of the secondary cylinder 14.

This check valve 50 is constructed and arranged to restrict passage of fluid under pressure from the secondary cylinder 14, to a braking mechanism, hereinafter described, in order to prevent sudden slamming or locking of the brakes. Being physically displaceable against the action of spring 46 it can permit an unrestricted return of said fluid from said braking mechanism and directly from chamber 16 into chamber 14 when pedal pressure is released.

A spool-shaped primary piston 52 formed with a socket 54 is normally urged toward the open or exterior end of the primary cylinder 12 and against a split ring stop 56 by a coil spring 58. The annular space between the outer and inner flanges, 60 and 62 respectively, of said piston 52, communicates through the port 24 with the reservoir 20 of the body 10.

Adjacent to the inner flange 62 of the piston 52 when in its outer or inactive position is a port 64 also communicating with the reservoir 20 and normally closed on the forward or pressure stroke by a flanged cup washer 66 and the said piston flange 62. It is through this port 64 that fluid is supplied to replenish the primary cylinder after pressure is released. The inner end of the primary piston 52 is also provided with a preferably cylindrical extension or plunger 68, the end of which is, with piston 52 in its inoperative position, in spaced relation to the secondary piston 42. Upon forward movement of the piston, however, plunger 68 is adapted to contact and actuate the secondary piston 42. The spacing of plunger 68 from the secondary piston 42 is provided to compensate for average brake adjustments and brake-shoe wear, and permits the initial movement of piston 52 to fill the system with fluid and to start the initial application of the brakes.

A push rod 70 has a free hemispherical end seated within the socket 54 of the primary piston 52 and the other end, for example, may be pivotally connected to a brake pedal 72 pivotally mounted upon a support 75 and connected by a retractile spring 76 to a fixed support 78. The linkage may be accomplished in any conventional or suitable manner.

The braking mechanism comprises fluid pressure delivery conduits or lines 80 connecting the ports 18 of the reduced chamber 16 to fluid pressure actuated brake cylinders 82 having the usual pistons (not shown) connected to brake shoes 84 within the usual brake drums 86, said shoes 84 being normally held in retracted or inoperative positions by the usual springs 88.

It should be understood that the primary and secondary cylinders 12 and 14, respectively, conduits 80 and brake cylinders 82 are charged with a suitable fluid (not shown) which is subject to pressure or pedal force, while the reservoir 20 and annular space between the flanges 60 and 62 of the primary piston 52 are charged with fluid (not shown) under substantially atmospheric pressure, the purpose and effectiveness of which will presently appear.

The device illustrating the invention operates as follows: Assuming the normal rest or inoperative position, shown in Figure 2, with the primary and secondary cylinders charged with fluid as well as a reserve in the reservoir 20, initial movement of the pedal 72, through push rod 70 and primary piston 52, will initiate the pressure stroke. Immediately by virtue of the movement of piston 52 a comparatively large volume of fluid (not shown) is displaced from the primary cylinder 12, through the centrally apertured secondary piston 42, the secondary cylinder 14 and the double check valve 50, into reduced chamber 16, out ports 18 and into conduits 80 to the brake cylinders 82 at a low pressure (i. e. a pressure less than the control pressure of the system as set by the adjusted spring 36) to take up slack, charge the pistons 82 and effect sufficient pressure to produce a slight drag of the shoes 84 upon the drums 86 and initiate the braking. The first slight pedal pressure moves piston 52 sufficiently to cause the cup 66 of piston flange 62 to seal off and close port 64, so that fluid in the primary cylinder 12 will be cut off from reservoir 20 and so subjected to the initial low pressure exerted by the operator upon the pedal. A minimum movement of the pedal 72, therefore, will instantly operate to charge the system preparatory to applying a braking load. All of this is accomplished by or before the time the inner end of the plunger 68 of the primary piston plunger 68 engages the seal 44 of the secondary piston 42 to close off the flow of liquid from the primary cylinder and into the secondary cylinder.

Piston 52 having moved the slight distance to cause the plunger 68 to engage piston 42, thereby closing or sealing off the central aperture thereof and stopping the flow of low pressure fluid to the system, further pressure upon or movement of the pedal 72 will move said piston 42 into the secondary cylinder 14. As piston 42 is of lesser diameter than the diameter of the primary piston 52, it is obvious that the volume of fluid displaced will be decreased but the fluid pressure will be greatly increased, and said fluid will be forced, through the check valve 50, ports 18, conduits 80 and into the drum cylinders 82 at an increased pressure to produce a braking effect of the shoes 84 on the drums 86.

From the foregoing, it will be observed that after a large volume of fluid has been displaced under comparatively low pressure by an initial, minimum movement of the pedal 72, further movement thereof is directed to the moving of a small volume of fluid under an increased pressure.

With the closing of the aperture of the secondary piston 42 by the inner end of the plunger 68, the pressure which is being built up by the further movement of piston 52 will be transmitted to the diaphragm 30 through channel 29 and, when sufficiently great in combination with the pressure acting on the high pressure piston 38, will cause it to raise from its seat 28, against the force of the spring 36 under the regulating plug 34. This permits the passage or release of the large excess volume of fluid under low pedal pressure from the primary cylinder 12, through said apertured diaphragm 30 and apertured plug 34, and into the reservoir 20 which is always at atmospheric pressure. At the same time the pedal pressure required to move the liquid in the secondary cylinder is reduced without diminishing the volume displaced.

Accordingly, as the fluid pressure between the secondary piston 42 and brake cylinders 82, produced by further movement of the pedal 72, builds up, it will be exerted against and will actuate the cap 27 and high pressure piston 38 within the high pressure cylinder 26 of the secondary cylinder 14. The combined pressures exerted on the diaphragm 30 will raise it from its seat and permit a flow, only when they overcome the resistance of the control spring 36, which is usually set at 50 P. S. I.

It will be observed that as the foot pedal 72 is being depressed the secondary piston 42 is moved forward. This builds up the line pressure to the brakes and at the same time the fluid pressure in front of the primary piston 52 builds up to the control setting of the control spring 36 so that the required foot pedal force uniformly increases until the fluid pressure is released in front of the primary piston 52. It is true, therefore, that as the fluid pressure under diaphragm 30 from cylinder 12 is reduced it permits spring 36 to exert more and more force against piston 38, thereby requiring a substantially increasing amount of secondary piston pressure to overcome the effective spring load. Further increase in the line pressure beyond this point causes the foot pedal force to build up slightly faster for each 100 P. S. I.

The system is controlled by the valve assembly which includes the high pressure cylinder 26, the diaphragm 30 and the spring 36, with their associated parts and connections. This valve relieves the foot pedal force above the setting of the device, which is the tension on the spring 36, without reducing the volume of higher pressure fluid going to the individual brakes. Thus, a greater braking action without a commensurately greater application of force to the pedal, can be achieved; or, conversely, the application of a much smaller increase of force to the pedal than would be expected is required, to increase the braking action.

When pressure on the pedal 72 is released, the retractile spring 76 will return it and the push rod 70 to normal or inoperative "off brake" position, during which return, the tension of the spring 58 will retract the primary piston 52 and its extension 68 will uncover the central aperture in the secondary piston 42, so that fluid within the cylinder 14 may by-pass to the primary cylinder. This will also release pressure within the secondary cylinder and the spring 46 will move the secondary piston 42 to its split stop ring 48. The tension of the spring 46 having been decreased, the check valve 50 is free to open and readily permit an unrestricted flow of fluid from the drum cylinders 82, thereby instantly releasing all braking effect.

During the return stroke of the primary piston 52, any fluid displaced from the primary cylinder 12 on the pressure stroke of piston 52 through the control valve assembly will be replenished through the port 64 from the reservoir 20. Also at the moment pressure on the pedal is released the control assembly functions immediately to reset the system. Since the pressure of the control spring 36 on diaphragm 30 exceeds the pressure on the pedal, the control valve assembly will immediately be returned and reset to the position shown in Figure 2. After pressure is removed from the pedal 72, the springs 46 and 58 will quickly return their respective pistons against their respective stops, and the springs 83 will retract the shoes 84 from the drums releasing the brakes.

A device for centrally controlling the flow of fluid to the individual brake devices is generally referred to and known as a compound master cylinder.

I claim:

1. In combination, a compound master cylinder unit for liquid pressure systems comprising a fluid reservoir, a primary cylinder communicating therewith and containing a piston for exerting pressure, a secondary cylinder communicating with said primary cylinder only in off and initial application of pressure, a release valve for fluid from said primary cylinder including a diaphragm formed with a port and positioned between said primary cylinder and said reservoir, and a high pressure cylinder open to said secondary cylinder and a piston having a castellated end adapted to contact said diaphragm around said port, characterized in that said diaphragm is movable under the pressure exerted thereagainst by said high pressure piston and by fluid in said primary cylinder.

2. A compound master cylinder unit for liquid pressure systems comprising a fluid reservoir, a primary cylinder communicating therewith, a primary piston in said cylinder for exerting pressures, a secondary high pressure cylinder axially aligned with said primary cylinder adapted to connect to a brake motor, a secondary piston in said secondary cylinder, a high pressure cylinder open into said secondary cylinder forwardly of said secondary piston, a high pressure piston in said high pressure cylinder, a centrally ported diaphragm in the wall of said primary cylinder adapted to make sealing contact with the end of said high pressure cylinder in its closed position, said high pressure piston being movable to contact said diaphragm to move it from said high pressure cylinder with the aid of the pressure in said primary cylinder acting thereon to enable fluid under pressure to escape from said primary cylinder, and tension means to control the force required to move said diaphragm to open position.

3. A compound master cylinder unit for liquid pressure systems comprising a fluid reservoir, a primary cylinder communicating therewith, a primary piston in said cylinder for exerting pressures, a secondary high pressure cylinder axially aligned with said primary cylinder adapted to connect to a brake motor, a secondary piston in said secondary cylinder, a high pressure cylinder open into said secondary cylinder forwardly of said secondary piston, a high pressure piston in said high pressure cylinder, a centrally ported flexible diaphragm closing an opening in the wall of said primary cylinder and positioned as to be contacted, when in its closed position, by the open end of said high pressure cylinder to close its central port from said primary cylinder, said diaphragm being acted upon by fluid under pressure in said primary cylinder on its surface at the sides of said high pressure cylinder, the high pressure piston in said high pressure cylinder being movable into contact with said diaphragm under the pressure of fluid in said secondary high pressure cylinder to move said diaphragm to break its seal with said high pressure cylinder to enable fluid from said primary cylinder to pass through its central port and into said reservoir.

4. In a compound master cylinder unit for liquid pressure systems of the type in which a low pressure cylinder-piston unit and a secondary high pressure cylinder-piston unit sequentially provide fluid under pressure to a receiving conduit; a fluid reservoir; a low pressure cylinder connected by openings at longitudinally spaced points to said reservoir, a spring-urged valve closing one of said openings, said valve including a centrally ported flexible diaphragm exposed to fluid pressure within said low pressure cylinder exteriorly of said central port and a seat, said port being adapted to be closed by said seat, a piston slidable in said low pressure cylinder adapted to close one of said openings in its advance in said cylinder; a secondary high pressure cylinder axially aligned with said low pressure cylinder and formed in its wall with a laterally extended high pressure cylinder positioned adjacent said valve and serving as said seat therefor, a piston in said laterally extended high pressure cylinder adapted in its advanced position to contact said valve and lift it from its seat to open said part, and a ported piston in said secondary high pressure cylinder positioned as to be contacted by means movable with the piston in said low pressure cylinder after a predetermined independent movement thereof to close the port therein, the advance of said ported piston forcing fluid at relatively high pressure from said secondary high pressure cylinder into a conduit and serving to advance said piston in said laterally extended cylinder to exert a valve-lifting force in the same direction as said pressure on said diaphragm to open said valve.

EDWARD KNAUSS.

REFERENCES CITED

The following references are of record in the file of this patent:

UNITED STATES PATENTS

| Number | Name | Date |
|---|---|---|
| 486,501 | Phillippi | Nov. 22, 1892 |
| 1,608,618 | Richards | Nov. 30, 1926 |
| 1,709,150 | Pieper | Apr. 16, 1929 |
| 1,919,465 | Furgason | July 25, 1933 |
| 1,958,722 | Sinclair | May 15, 1934 |
| 2,036,342 | Loweke | Apr. 7, 1936 |
| 2,184,501 | Loweke | Dec. 26, 1939 |
| 2,190,238 | Lepersonne | Feb. 13, 1940 |
| 2,196,190 | Bowen | Apr. 9, 1940 |
| 2,215,602 | Baade | Sept. 24, 1940 |
| 2,298,848 | Swift | Oct. 13, 1942 |
| 2,317,604 | Hamilton | Apr. 27, 1943 |

FOREIGN PATENTS

| Number | Country | Date |
|---|---|---|
| 515,709 | Great Britain | Dec. 12, 1939 |

Certificate of Correction

Patent No. 2,508,403                                                     May 23, 1950

EDWARD KNAUSS

It is hereby certified that error appears in the printed specification of the above numbered patent requiring correction as follows:

Column 8, line 15, for the word "part" read *port*;

and that the said Letters Patent should be read as corrected above, so that the same may conform to the record of the case in the Patent Office.

Signed and sealed this 10th day of October, A. D. 1950.

[SEAL]

THOMAS F. MURPHY,
*Assistant Commissioner of Patents.*